Dec. 18, 1962   A. A. FAULKNER   3,068,750
APPARATUS FOR THE EXAMINATION OF CONTACT LENSES OR THE LIKE
Filed May 23, 1960

*INVENTOR.*
ALBERT A. FAULKNER
BY
ATTORNEYS

United States Patent Office 3,068,750
Patented Dec. 18, 1962

3,068,750
APPARATUS FOR THE EXAMINATION OF
CONTACT LENSES OR THE LIKE
Albert A. Faulkner, Pitman, N.J., assignor to Norman
W. Edmund, Pauline A. Edmund, Robert M. Edmund,
Joan A. Edmund, and Jane P. Edmund, copartnership,
doing business as Edmund Scientific Co., Barrington,
N.J.
Filed May 23, 1960, Ser. No. 31,083
1 Claim. (Cl. 88—40)

This invention relates to apparatus for microscopic examination of contact lenses or similar objects.

The edges of contact lenses must be smooth and properly formed and it is the general object of the present invention to provide a simple apparatus for the microscopic examination of the edges of such lenses. Since the edge should be examined in a direction normal to the axis of the lens the support of the lens for this purpose is a matter of some difficulty. The general object is to provide a lens support making it possible to examine a lens edge throughout its circumference.

The general object of the invention and other objects relating to details will become apparent from the following description read in conjunction with the accompanying drawing in which.

Figure 1:
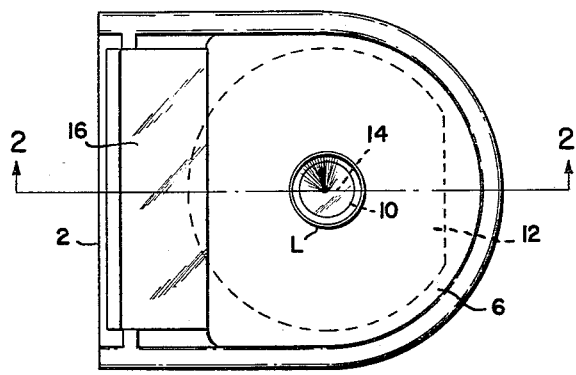
FIGURE 1 is a plan view of the support.
Figure 2:
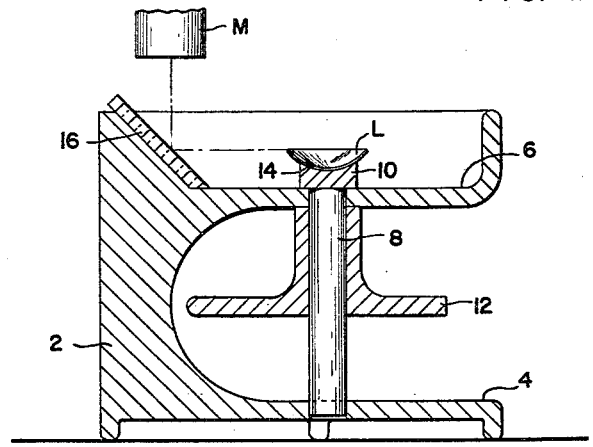
FIGURE 2 is a vertical section through the support on the plane 2—2 of FIGURE 1.
Figure 3:
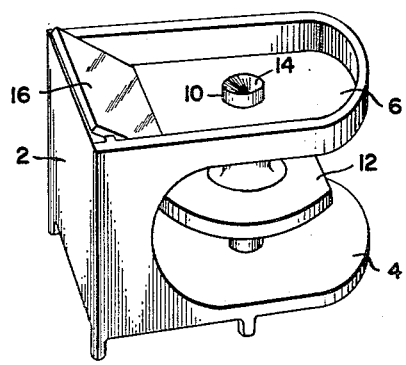
FIGURE 3 is a perspective view of the same.

The support comprises a base member 2 provided with a foot portion 4 and with a horizontal platform 6. This base may be molded from a plastic material or metal.

Mounted for rotation in the support is a pin 8 provided with a head 10, the pin passing through vertically aligned openings in the foot portion and platform. Carried by a press fit on the spindle or pin 8 is a disc 12 the upper portion of which in conjunction with the head 10 limits the spindle or pin 8 against axial movement but provides for free rotation. The head 10 is provided with a socket 14 of concave form on which the lens L to be examined may rest.

Secured to the support 2 at a 45° angle with respect to the horizontal is a mirror 16 located as shown with its central portion opposite the upper end of the spindle 8 and the lens L supported in the socket therein.

The socket is of such dimensions that the edges of the lens L will extend radially therebeyond so that the edge is viewable throughout its circumference. The support is located below the objective of a microscope M so that the mirror is intersected by the axis of the microscope. As will be evident, with this placement the microscope may be focused vertically as usual and the edge of the lens examined throughout its circumference by turning the spindle by means of the disc thereon.

It will be evident that various changes in details may be made without departing from the invention as described in the following claim.

What is claimed is:

Apparatus for mounting a contact lens for microscopic examination of an edge thereof comprising a support member, said member having a vertical portion and extending horizontally therefrom a lower foot portion and an upper platform portion, a spindle mounted in said foot and platform portions and rotatable therein about a vertical axis, the upper end of said spindle extending above said platform and being provided with a concave socket for receiving the lens, and a mirror mounted on said support member at approximately the level of said upper spindle end and inclined at an angle to reflect lateral rays from the edge of the supported lens upwardly into a microscope, said spindle being provided with a disc for manual rotation of the spindle.

References Cited in the file of this patent
UNITED STATES PATENTS

| | | |
|---|---|---|
| 2,379,629 | Ewenson | July 3, 1945 |
| 2,381,634 | Back | Aug. 7, 1945 |
| 2,854,887 | Lankes | Oct. 7, 1958 |
| 2,934,993 | Chromy | May 3, 1960 |